United States Patent Office 3,372,505
Patented Mar. 12, 1968

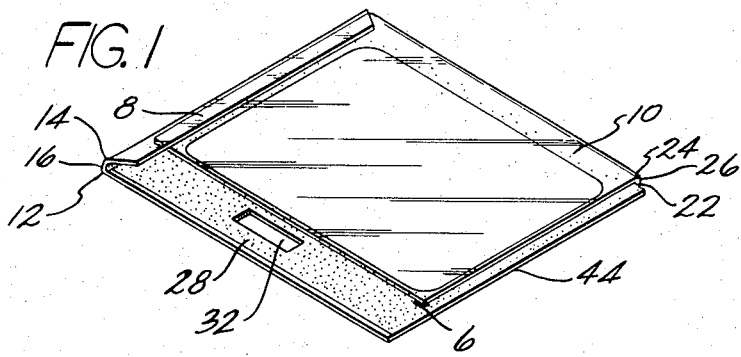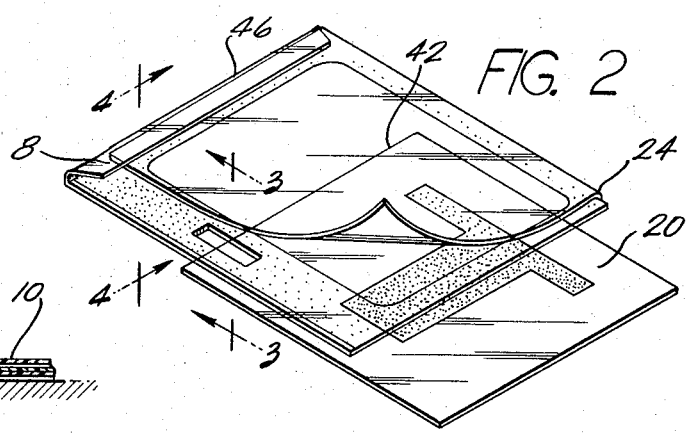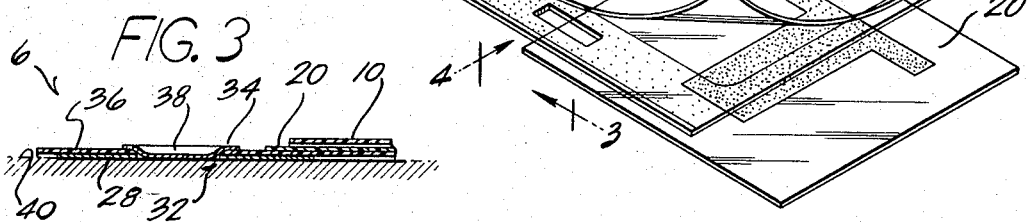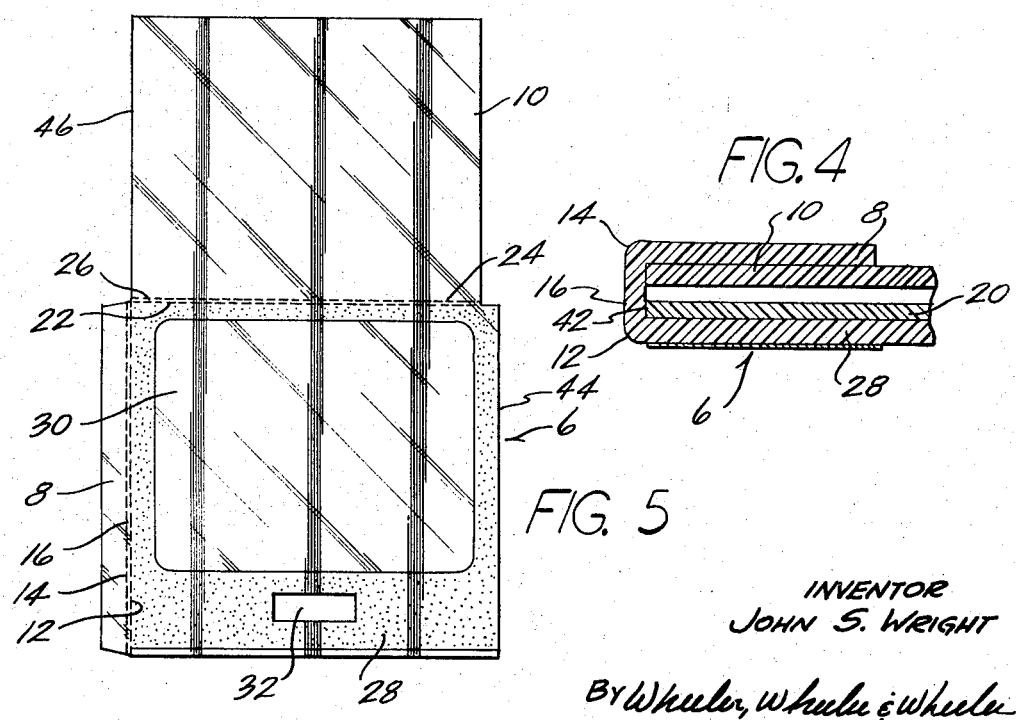

3,372,505
HOLDER AND REGISTRATION DEVICE FOR TRANSPARENCIES FOR OVERHEAD PROJECTION
John S. Wright, 627 E. Birch Ave., Milwaukee, Wis. 53217
Filed Oct. 24, 1965, Ser. No. 504,700
5 Claims. (Cl. 40—158)

ABSTRACT OF THE DISCLOSURE

To register transparencies on the stage of an overhead projector, the holder integrally comprises a base sheet with upstanding flanges on contiguous margins, there being a narrow strip on one of said flanges and a cover sheet on another, the base sheet having framing opaque coating means and a slot spanned by pressure sensitive tape deformable through the slot for engagement with a projection stage for positioning the holder.

---

This invention relates to a holder and registration device for transparencies for overhead projection.

Many such transparency holders are commercially available, some of them being designed for registering a plurality of transparencies with each other. In common with these previous holders, the present invention seeks to permit the use of transparencies for overhead projection which are materially smaller than the average overhead projector light stage, the holder including framing means for shutting off such light from the stage as is not required to pass through the transparency area. This holder is also intended to act as a fixed positional or placement guide to orient the transparency properly on the stage so that the projected image will appear on the selected portion of the screen.

The instant holder and registration device comprises a sheet of acetate or the like which is materially heavier than the transparency film. It need not be rigid but should be heavy enough to permit ready handling with or without the transparency being mounted thereon.

The heavy mounting or base sheet has a central transparent area about which the sheet is rendered opaque to frame the transparency. In one relatively heavy border, an opening is cut completely through the sheet to receive a length of tape coated with pressure-sensitive adhesive, ordinary masking tape being appropriate. This tape adheres marginally to the mounting sheet and its adhesively coated surface is thereby normally maintained free of contact with the glass of the projectional stage, being separated therefrom by the thickness of the mounting sheet. However, the flexibility of the tape is such that it can be forced into adhesive contact with the glass of the projection stage, thereby accurately positioning the device on the stage. It is readily removed from the stage and can be used repeatedly and readily replaced on the base sheet when necessary.

One side margin of the base sheet is folded over to make an upright flange and narrow retaining strip, the fold being thick enough to receive and position one or more transparencies for projection. A cover ply extension from a similar flange at the contiguous top margin of the sheet has an area sufficient to cover the entire transparency and it provides a broad fold cooperating with the fold first mentioned to locate the transparency and to register a plurality of superimposed transparencies in the event that a plurality are to be used in the holder.

The fact that the last mentioned ply is integral with the base sheet is very valuable in the protection of the transparencies mounted therebeneath. The fact that it completely covers such transparencies is a significant protective factor and permits the operator of the overhead projector to write any desired note directly upon this cover ply where it can be read as a part of the projected image of the transparency.

In the drawings:

FIG. 1 is a fragmentary view in perspective of a transparency holder and registration device embodying the invention, the cover ply being folded up and portions thereof being broken away.

FIG. 2 is a view similar to FIG. 1 showing a transparency in the course of being introduced into the holder beneath the cover ply, the latter being shown partially curled up.

FIG. 3 is a detail view taken in section on the line 3—3 of FIG. 2, portions of the face of the projection stage being diagrammatically and fragmentarily illustrated.

FIG. 4 is an enlarged detail view taken in section on the line 4—4 of FIG. 2.

FIG. 5 is a plan view of the blank from which a holder and registration device embodying the invention is formed.

With the exception of the renewable masking tape used to anchor the device to the projection stage, the entire device is made in one piece as shown in FIG. 5, to include the base sheet 6, the lateral positioning flanges 16 and 26, the strip 8 connected with flange 16, and the cover ply 10 connected with flange 26. In effect, a double-scored bend between the base sheet 6 and the strip 8 provides two slightly spaced approximately right angle corners at 12 and 14 between which there is a narrow upright work-positioning flange or side wall at 16 against which the transparency 20 can be pushed for positive location in a transverse direction.

Similarly, corners substantially at right angles are provided by the double-scoring at 22 and 24 between the base sheet 6 and the cover ply 10 to define an upright work-positioning flange or rear wall at 26 against which the transparency 20 may be pushed for positive location in a direction extending from front to rear.

The base sheet 6 is provided with an opaque border at 28 framing a central transparent area 30 in which the projected portion of the transparency is framed. The border may be made by silk screen printing or otherwise directly upon the lower face of the base sheet.

The slot 32 in the border 28 is made by die cutting or otherwise to have a strip 34 of adhesively coated tape such as conventional masking tape applied over it. As best shown in FIG. 3, the masking tape will adhere to the clear top surface 36 of the base sheet 6. It will normally be held by the thickness of the base sheet free of any underlying surface but may be deformed downwardly as shown at 38 in FIG. 3 to engage its pressure-sensitive adhesive coating with the underlying surface 40. The surface 40 shown in FIG. 3 diagrammatically illustrates a surface such as the surface of the projection stage. Adhesion of the tape to such surface as well as to the base sheet 6 will accurately locate the entire device on the projection stage. The mere lifting of the device from the projection stage will strip the tape free of the stage and the same tape may be used again and again. The tape is readily removed from the top surface 36 of the base sheet 6 when tape replacement is required.

In the finished device, the lateral flange 8 of base sheet 6 is folded over to provide a narrow border strip as best shown in FIGS. 2 and 4. The upright lateral wall or flange 16 constitutes a stop against which the side 42 of the transparency 20 may be pushed for accurate registration.

Desirably, the cover ply 10, integral with the base sheet, is offset slightly inwardly from the margin 44 of the base sheet and has its side edge 46 underlying the strip 8 as is clearly shown in FIG. 2. The double scoring at 22 and 26 leaves a vertical work-positioning flange or wall 24 against which the transparency 20 may be pushed rearwardly to locate it accurately. The height of these positioning walls or flanges 16 at the side and 26 at the rear will not necessarily be equal to twice the thickness of the transparency but they should at least be considerably higher than the transparency is thick so that a second transparency can be superimposed on the first and registered therewith, without straining or distorting the holder. If more than two transparencies are to be superimposed, the score lines will be located slightly farther apart to increase the height of the registering flanges or walls.

I claim:

1. A transparency holder comprising a base sheet having at one side an upstanding flange and an inwardly projecting strip overlying the base sheet, said sheet having at a contiguous side margin a cover ply joined with an upstanding flange to the base sheet, the base sheet having an opaque framing area and an intermediate transparent area, across a major portion of which the cover ply extends.

2. A transparency holder according to claim 1 in which the upstanding flanges, strip and cover ply are integral with the base sheet, the cover ply extending substantially across the transparent area of the base sheet whereby to be adapted to protect a transparency and to receive handwritten notes over the face thereof.

3. A transparency holder according to claim 2 in which the base sheet has an aperture extending completely through it, and a tape having a pressure-sensitive adhesive coating attached to the base sheet about the aperture and having a part of such coating exposed in the aperture, the tape being deformable to engage with an underlying surface the coating thus exposed.

4. A work holder according to claim 1 in which the work to be held is a transparency, and in further combination with a cover ply integral with the base sheet, there being an intervening flange upstanding between the base sheet and cover ply and constituting means for registering the portion of a transparency on the base sheet, the base sheet having an additional such flange on a contiguous side margin and having a folded-over strip overlying the side of the base sheet and integral with said last mentioned flange.

5. A work holder according to claim 1 in which the work to be held is a transparency, and in further combination with a cover ply integral with the base sheet and cover ply and constituting means for registering a transparency with the base sheet, the base sheet having an additional such flange on a contiguous side margin and having a folded-over strip underlying the cover ply and overlying the side of the base sheet and integral with said last mentioned flange, the base sheet having on its lower surface a border-forming opaque coating about an uncoated transparent central area with which transparencies mounted in said holder are to be registered.

References Cited
UNITED STATES PATENTS

| | | | |
|---|---|---|---|
| 1,807,442 | 5/1931 | Schwartz | 40—125 |
| 2,118,384 | 5/1938 | Patten | 40—159 |
| 2,952,930 | 9/1960 | Hartle et al. | 40—10 |
| 3,281,977 | 11/1966 | Koontz | 40—158 |

EUGENE R. CAPOZIO, *Primary Examiner.*

W. J. CONTRERAS, *Examiner.*